United States Patent [19]

McMillan

[11] 4,254,342

[45] Mar. 3, 1981

[54] MULTIPLEXED INCREMENTAL POSITION CONTROLLER

[75] Inventor: Andrew H. McMillan, Wayne, Mich.

[73] Assignee: Burroughs Corporation, Detroit, Mich.

[21] Appl. No.: 33,963

[22] Filed: Apr. 27, 1979

[51] Int. Cl.³ .................................................. G01N 21/86
[52] U.S. Cl. .................................... 250/561; 271/215
[58] Field of Search ................... 271/215, 259, 258; 250/561, 221, 222, 223, 578

[56] References Cited

U.S. PATENT DOCUMENTS

| 3,029,075 | 4/1962 | Templeton et al. | 271/215 |
| 3,932,272 | 1/1976 | Carnes et al. | 250/561 |

*Primary Examiner*—David C. Nelms
*Attorney, Agent, or Firm*—Charles E. Quarton; Kevin R. Peterson

[57] ABSTRACT

A plurality of pockets of a document sorter are controlled by a time-division multiplexed controller, in order to insure that the bottom and leading edges of documents within each pocket are aligned. The controller utilizes a programmed microcomputer in a time-division multiplexed arrangement in order to increase hardware efficiency.

11 Claims, 12 Drawing Figures

FIG. 4.
SINGLE STEP RESPONSE

FIG. 6.
DECISION TIME ALLOCATION FOR A MULTIPLEXED CONTROLLER

FIG.5.

FIG. 7. INTEL 8048 BLOCK DIAGRAM

FIG.8A. SENSOR INPUT MULTIPLEXING.

MICROCOMPUTER PROGRAM STRUCTURE.

MULTIPLEXED INCREMENTAL POSITION CONTROLLER

BACKGROUND OF THE INVENTION

1. Field of the Invention

This invention relates to a position controller for controlling the pockets of a document sorter and more particularly to a multiplexed incremental position controller for simultaneously controlling a plurality of pockets.

2. Description of the Prior Art

Figure 1:
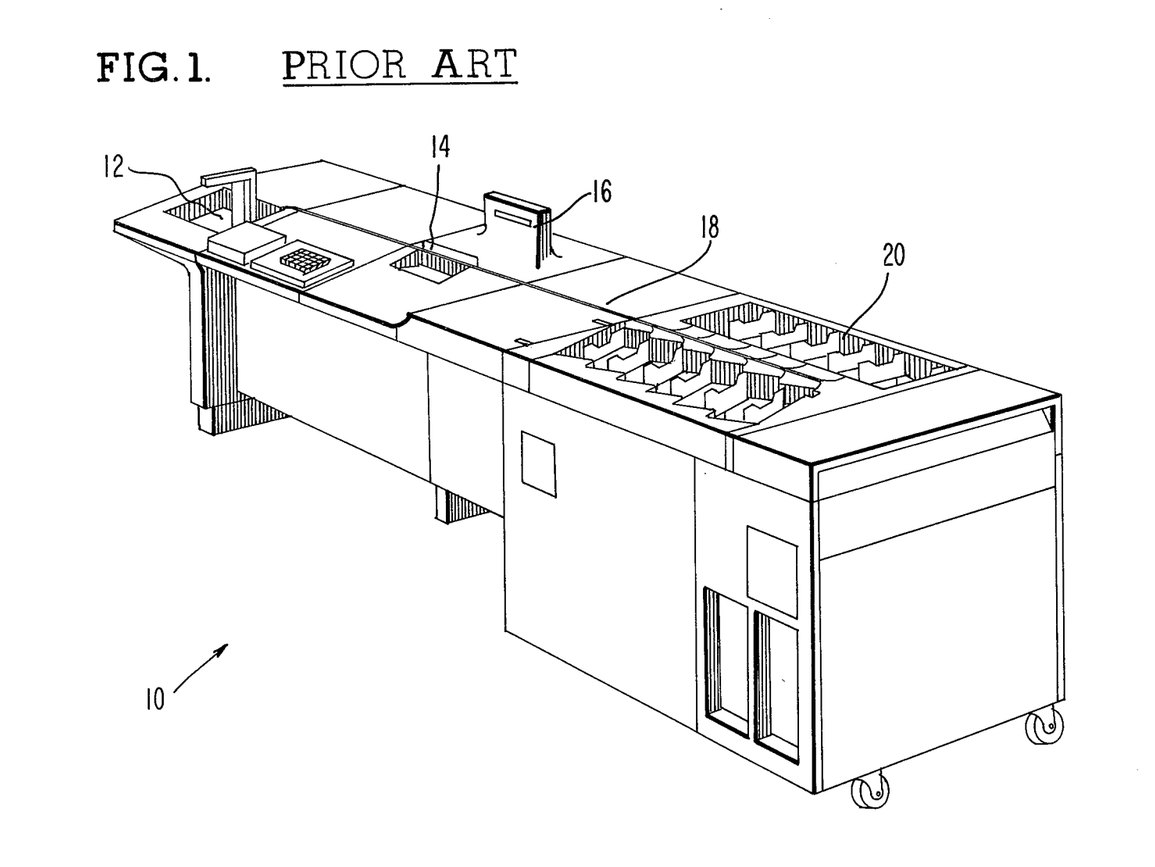
FIG. 1 is a front view of a typical document sorter.

FIG. 1 illustrates a typical encoder/sorter system generally at 10. The system 10 processes documents, such as checks and credit card receipts from left to right. Documents are placed in a feed hopper 12 by an operator, and then progress the length of the machine. After a document has passed a reader 14, an operator view station 16 and an encoder/endorser area 18, it is sorted to one of a plurality of pockets within a pocket area 20, based upon information collected during the processing of that document. As documents are sorted into the pockets, it is desirable to ensure that the bottom and leading edges of the documents are aligned, so as to facilitate subsequent operations. In order to obtain the desired degree of alignment, it is necessary to control the position of the stack of documents within each pocket.

Figure 2A:
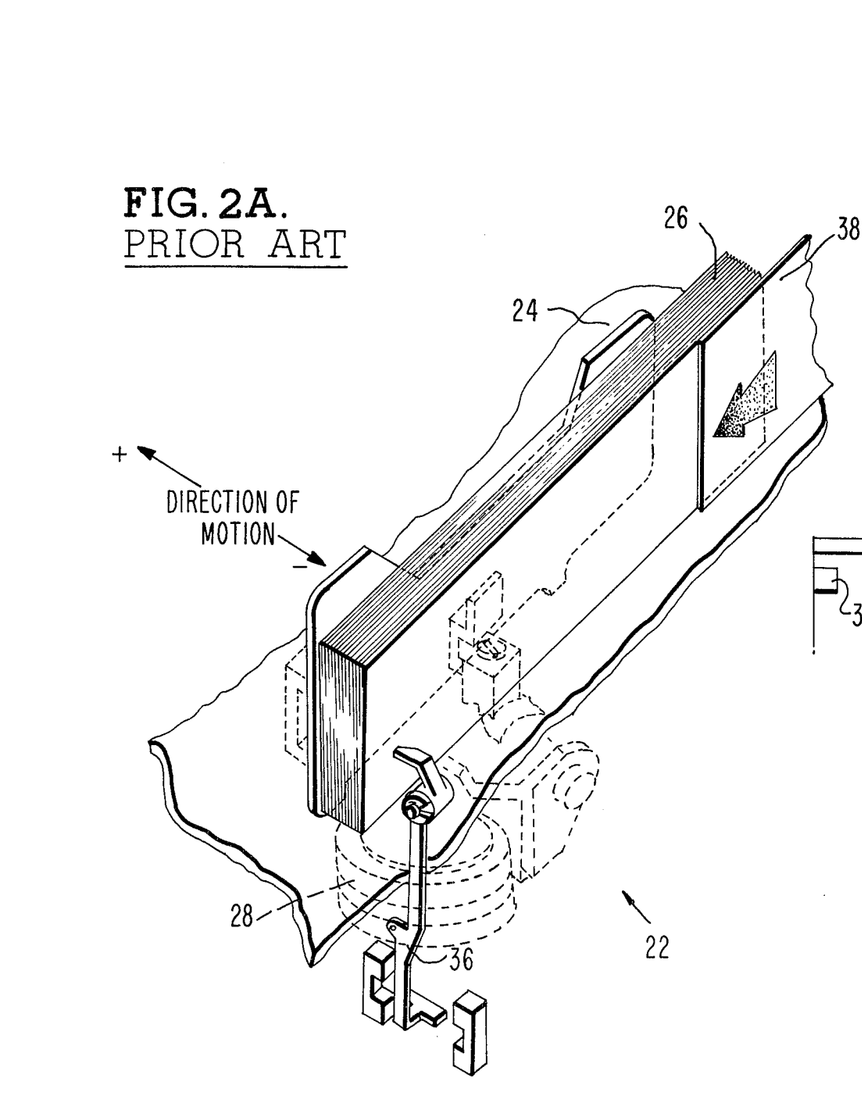
FIG. 2A is a detailed three-quarter front view of a pocket.
Figure 2B:
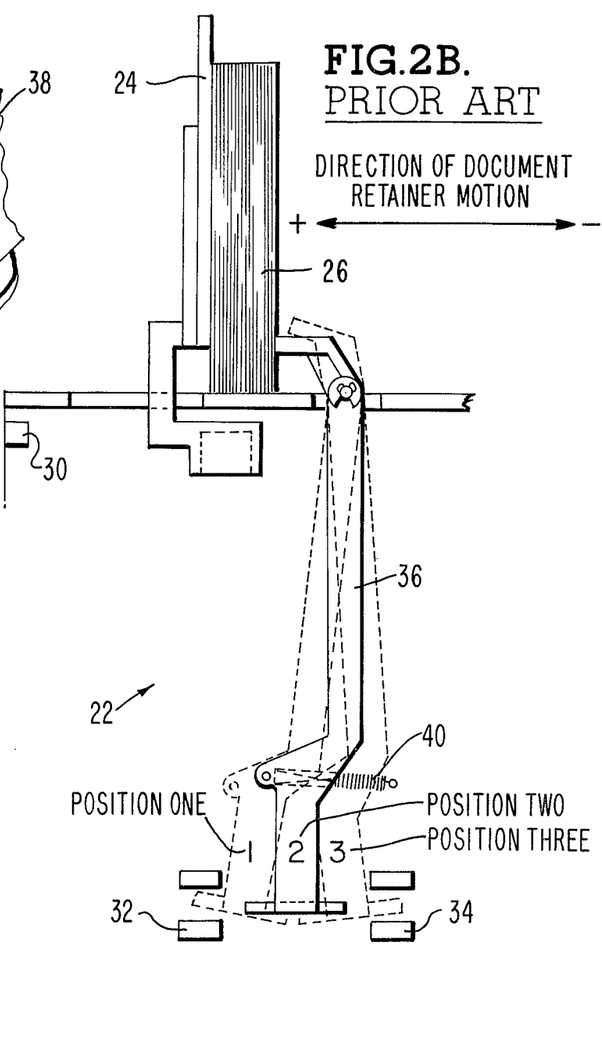
FIG. 2B is a detailed end view of the pocket of FIG. 2A.

FIGS. 2A and 2B shows the basic components of one pocket generally at 22. A document retainer 24 supports a document stack 26, and is connected to a D.C. stepping motor 28 by means of a rack and pinion gear (not shown). A document retainer stop 30 limits the maximum travel of the document retainer 24 to approximately 2.25 inches. A step-out sensor 32 and a step-in sensor 34 are each optoelectronic transmissive sensors utilizing LED's and silicon phototransistors. The mechanical position of the step-in and step-out sensors 32 and 34 is such that a minimum of twelve documents must enter a pocket to move a sensor actuator 36 from position 3 to position 1.

As a new document 38 enters the document stack 26, it positions itself between the last document to enter the stack and the sensor actuator 36. After a sufficient number of documents have entered the pocket, the sensor actuator 36 will be moved to position 1, breaking the optical path in the step-out sensor 32. A control system (detailed hereinafter) recognizes this condition and moves the document retainer away from the sensor actuator 36 (in the + direction) until a return spring 40 returns the actuator 36 to position 2. When an operator removes the documents 26, the return spring 40 moves the switch actuator into position 3, breaking the optical path in the step-in sensor 34. The control system recognizes this condition and moves the document retainer 24 toward the sensor actuator 36 (in the − direction), until the actuator returns to position 2. For proper operation of the pocket, it was empirically determined that the control system must respond differently to changes in the size of the document stack, depending on whether the change is a positive change (i.e. increasing size), or a negative change (i.e. decreasing size). An increase in the size of the document stack 26 is caused by a document 38 entering the pocket. This change is of a small magnitude (between 0.003" and 0.008" per document) and may be accompanied by switch bounce, due to the impact of the document on the actuator 36. Since documents generally move at a velocity such that they are spaced at least 100 milliseconds apart, and the switch bounce typically lasts 50 milliseconds, a control system should have a response time in the positive direction of approximately 75 milliseconds.

A decrease in the size of the document stack 26 is caused by an operator removing documents from the pocket. The change is of a relatively large magnitude and switch bounce is negligible. Since it is desirable to restore the retainer to the stable position as quickly as possible, the control system should have a relatively short response time in the negative direction.

Figure 3:
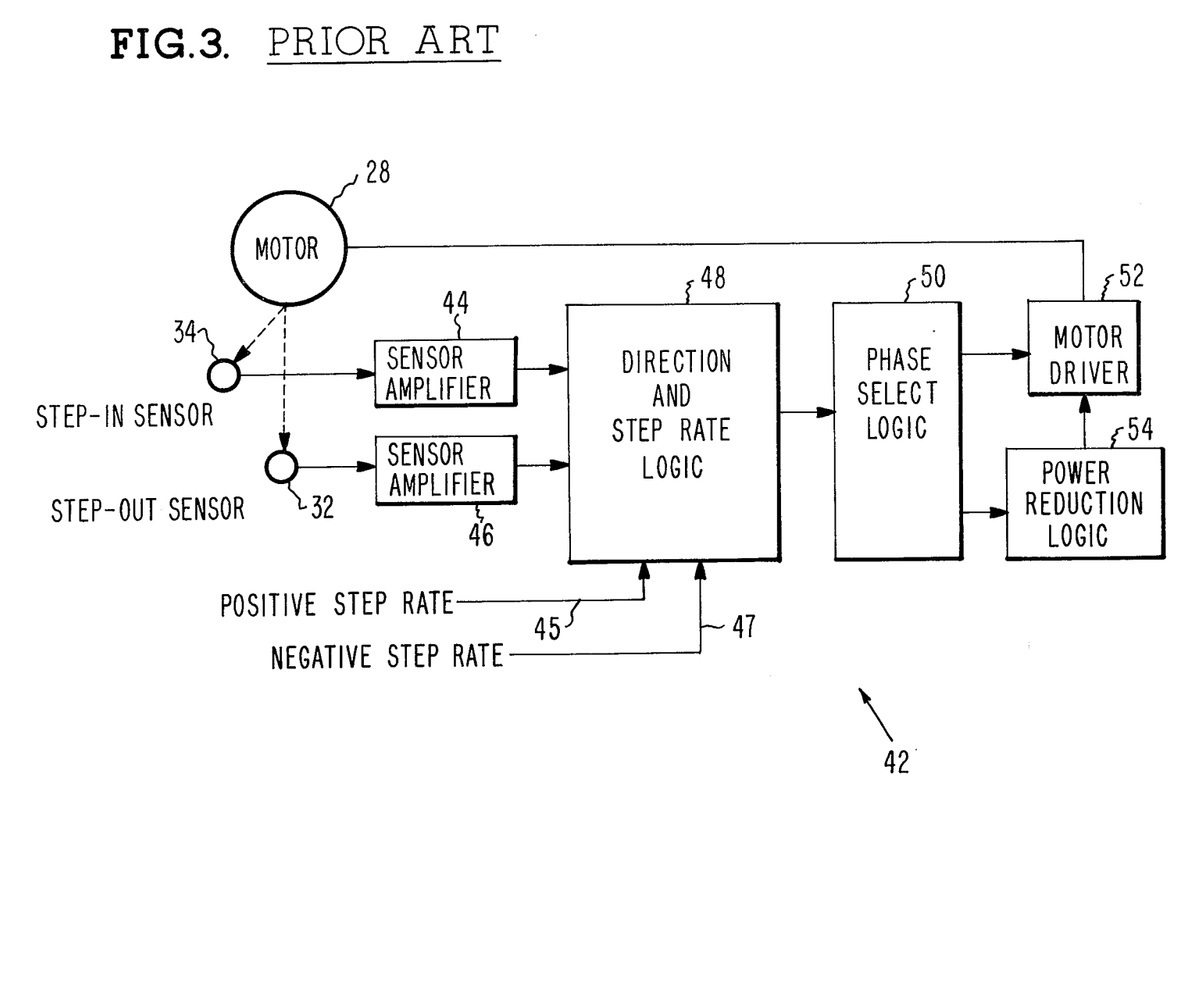
FIG. 3 is a block diagram of a conventional closed loop controller.

A conventional approach to controlling a plurality of pockets is to include a separate closed loop controller for each pocket. FIG. 3 shows such a controller generally at 42. A pair of sensor amplifiers 44 and 46 buffer the output of the sensors 32 and 34, and convert the outputs of the sensors 32 and 34 to a digital level. A direction and step rate logic circuit 48 combines the output of the sensors 32 and 34 with the signals from positive and negative step rate lines 45 and 47 respectively and outputs the appropriate direction and rate signals to a phase select logic circuit 50. The phase select logic 50 converts the direction and rate signals into a sequence of motor winding excitations, and a motor driver 52 converts the digital signals to the required power and voltage levels. A power reduction logic circuit 54 senses 100 milliseconds of continuous motor inactivity, and de-energizes all windings of the motor 28 during the remainder of the inactive period.

Figure 4:
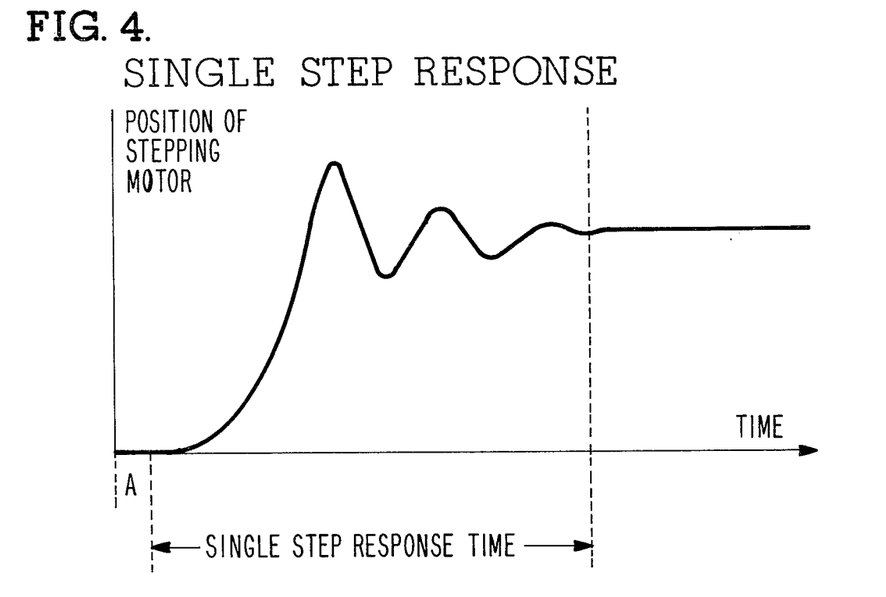
FIG. 4 illustrates the single step response of the stepping motor utilized in the preferred embodiment of the invention.

FIG. 4 shows the single step response of a typical stepping motor 28 in a lightly damped system. The time interval "A" represents the time required by the controller of FIG. 3 to determine that a step is required and to calculate and deliver the appropriate motor command. Once the command has been initiated, the controller 42 must wait for the stepping motor 28 to settle in its new position. Only after the settling is complete can the output of the sensors 32 and 34 be used to determine if additional steps are required. Consequently, during the single step response time, the controller 42 is idle. Therefore, to increase the hardware efficiency, a single controller can be utilized in a time-division multiplexed mode to control a plurality of pockets.

SUMMARY OF THE INVENTION

It is an object of the invention to increase hardware efficiency, that is the ratio of decision time to idle time by utilizing a time-division multiplexed controller. In general this is accomplished by utilizing low cost programmable control element in an arrangment whereby each of a plurality of pockets is controlled within an appropriate time frame. By utilizing a relatively rapid controller to control several identical but relatively slow pockets, the amount of circuitry required is minimized.

DESCRIPTION OF THE PREFERRED EMBODIMENT

The preferred embodiment of the invention includes twelve pockets which are controlled by a time-division multiplexed controller. It is to be understood that any number of pockets can be controlled in this manner, and that the particular number of pockets in the preferred embodiment is for purposes of illustration.

Figure 5:
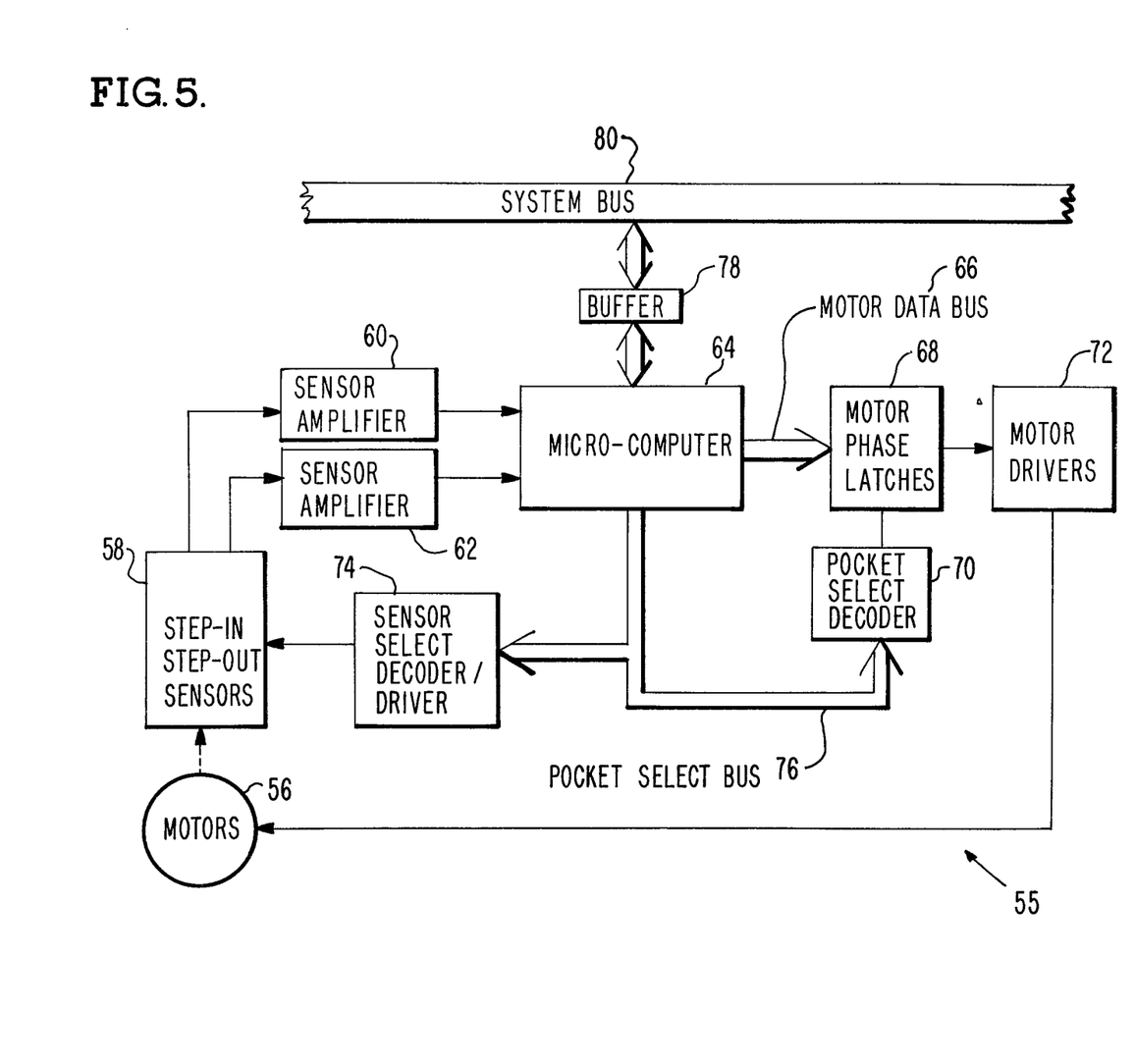
FIG. 5 is a block diagram of a preferred embodiment of the invention.

In FIG. 5 a block diagram of a preferred embodiment of the invention is shown generally at 55. A plurality of motors 56 (twelve motors in the preferred embodiment) are mechanically and optically coupled to the same number of pairs of step-in and step-out sensors 58. A pair of sensor amplifiers 60 and 62 buffer the output of the sensors 58 and convert the outputs to digital signals. These digital signals are fed into a micro-computer 64. In the preferred embodiment of the invention the micro-computer 64 is an INTEL 8048 integrated circuit.

A motor data bus 66 feeds a set of (twelve in the preferred embodiment) motor phase latches 68. Each motor phase latch of the motor phase latches 68 latches data from the motor data bus 66 when enabled by a pocket select decoder 70. Each motor phase latch of the motor phase latches feeds one motor driver within a set of motor drivers 72. Each motor driver of the motor drivers 72 is connected to a particular motor of the motors 56.

The micro-computer 64 also feeds a sensor select decoder/driver 74 and the pocket select decoder 70 through a pocket select bus 76. A buffer 78 transfers signals from the micro-computer 64 to a system bus 80. The system bus 80 transfers information to and from other systems within the document sorter 10 (shown in FIG. 1).

Referring to both FIGS. 3 and 5 the power reduction logic 54, the direction and step logic 48 as well as the generation of positive and negative step rates from lines 45 and 47 of FIG. 3 are all implemented in the micro-computer 64 of FIG. 5. In addition, the micro-computer 64 controls the pocket selection and overall timing. It is to be understood that for a twelve pocket system, for example, there will be twelve motors within the motors 56, twelve motor drivers within the motor drivers 72, twelve motor phase latches within the motor phase latches 68, and twelve sets of step-in and step-out sensors within the sensors 58. Each selected pocket is controlled by a corresponding motor, motor driver, motor phase latch and set of sensors.

In operation the micro-computer 64 sends an appropriate signal through the pocket select bus 76 to the sensor select decoder/driver 74 and the pocket select decoder 70. The decoder/driver 74 then selects one pair of step-in and step-out sensors from the sensors 58, and the pocket select decoder 70 selects the corresponding motor phase latch of the motor phase latches 68. The pair of sensors selected by the decoder/driver 74 sends information regarding the state of the corresponding actuator 36 (shown in FIG. 2) to the sensor amplifiers 60 and 62.

Figure 6:
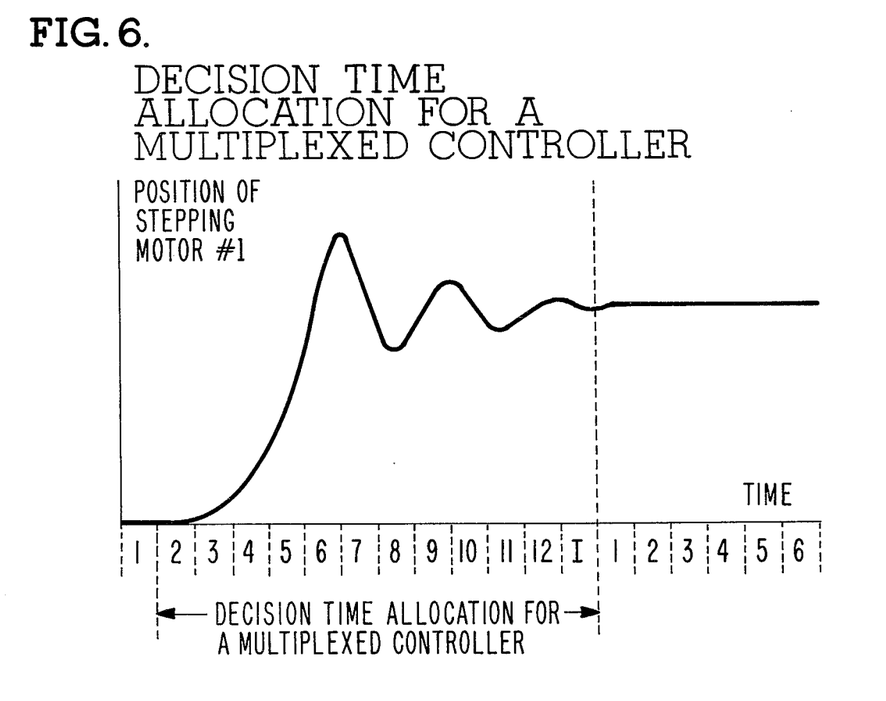
FIG. 6 illustrates the decision time allocation for the multiplexed controller of the preferred embodiment of the invention.

This information is processed by the micro-computer 64 and the appropriate command is sent to the selected motor phase latch of the motor phase latches 68. The motor phase latch selected by the pocket select decoder 70 latches the command from the motor data bus 66, and activates the associated motor driver from the motor drivers 72. The motor driver then drives the selected motor, which in turn moves the appropriate document retainer 24 (in FIG. 2). The micro-computer 64 then outputs the appropriate code on the pocket select bus 76 to check the condition of the succeeding pocket and the procedure repeats. As shown in FIG. 6, during the period required for the stepping motor of the first pocket to settle, the controller 55 is able to access and sample each of the 12 pairs of step-in and step-out sensors and send out the appropriate command to each separate motor of the motors 56. When the controller 55 has accessed each pair of sensors, the controller then returns to determine the condition of the first set of sensors.

Figure 7:
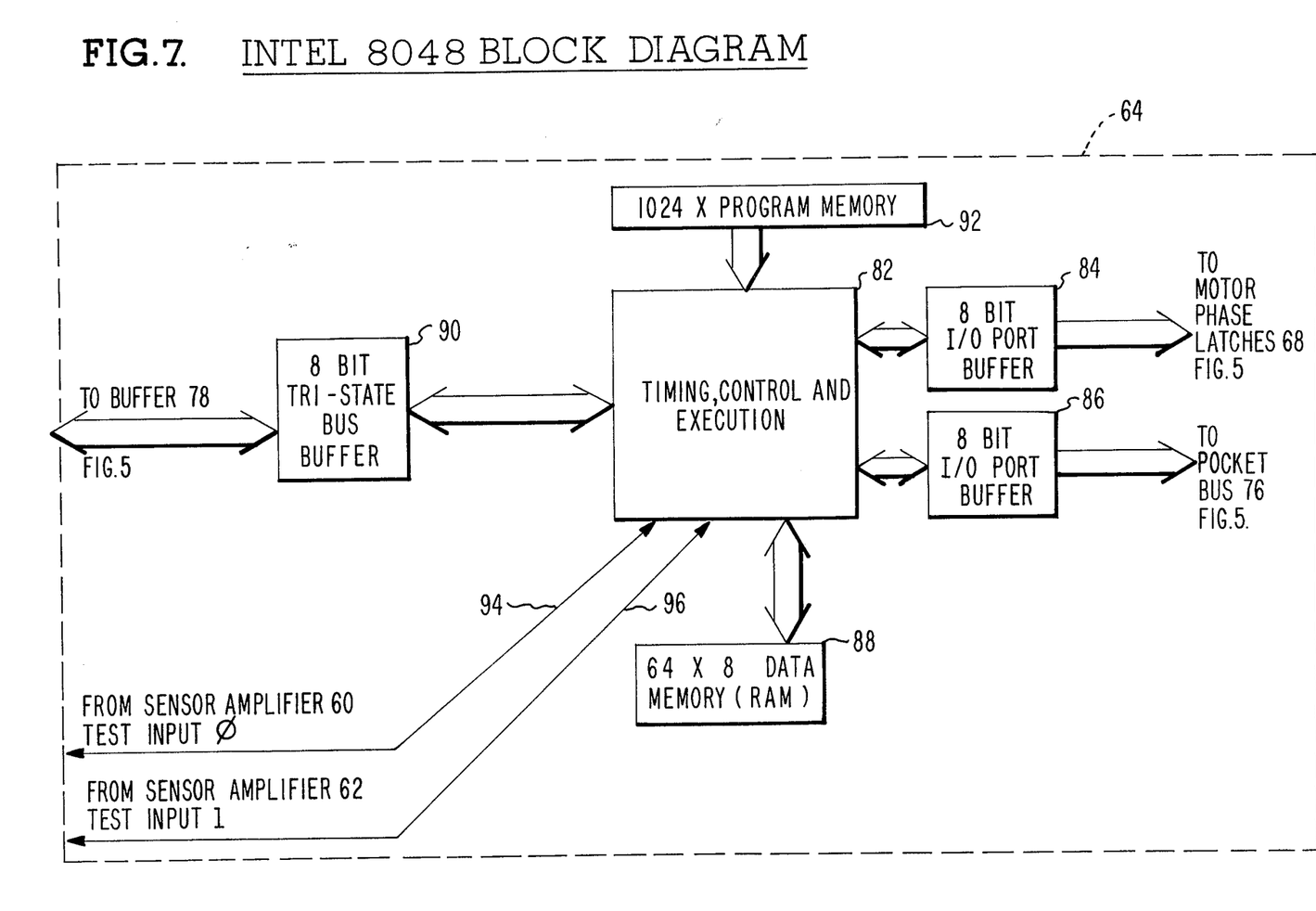
FIG. 7 is a block diagram of an INTEL 8048, which is utilized in the preferred embodiment of the invention.

FIG. 7 details the INTEL 8048 micro-computer which is utilized in the preferred embodiment of the invention as shown in FIG. 5. A timing, control and execution block 82 is connected to a pair of eight bit input/output port buffers 84 and 86, a random access memory 88, an eight bit tri-state buffer 90, and a 1024×8 program memory 92. A test input 0, 94, is connected to the output of the sensor amplifier 60, and a test input 1, 96, is connected to the output of the sensor amplifier 62. The allocation of the data and control signals to the various input/output lines of the INTEL 8048 in the preferred embodiment is as follows. The motor data bus 66 (see FIG. 5) is driven by one-half of the eight bit input/output port buffer 34. The pocket select bus 76 (see FIG. 5) is driven by one-half of the eight bit input/output port buffer 36. The buffer 78 (see FIG. 5) is connected to the eight bit tri-state buffer 90. It is to be understood that although a specific allocation of input/output lines is utilized in the preferred embodiment of the invention, many alternate allocations are possible.

Figures 8, 8A:
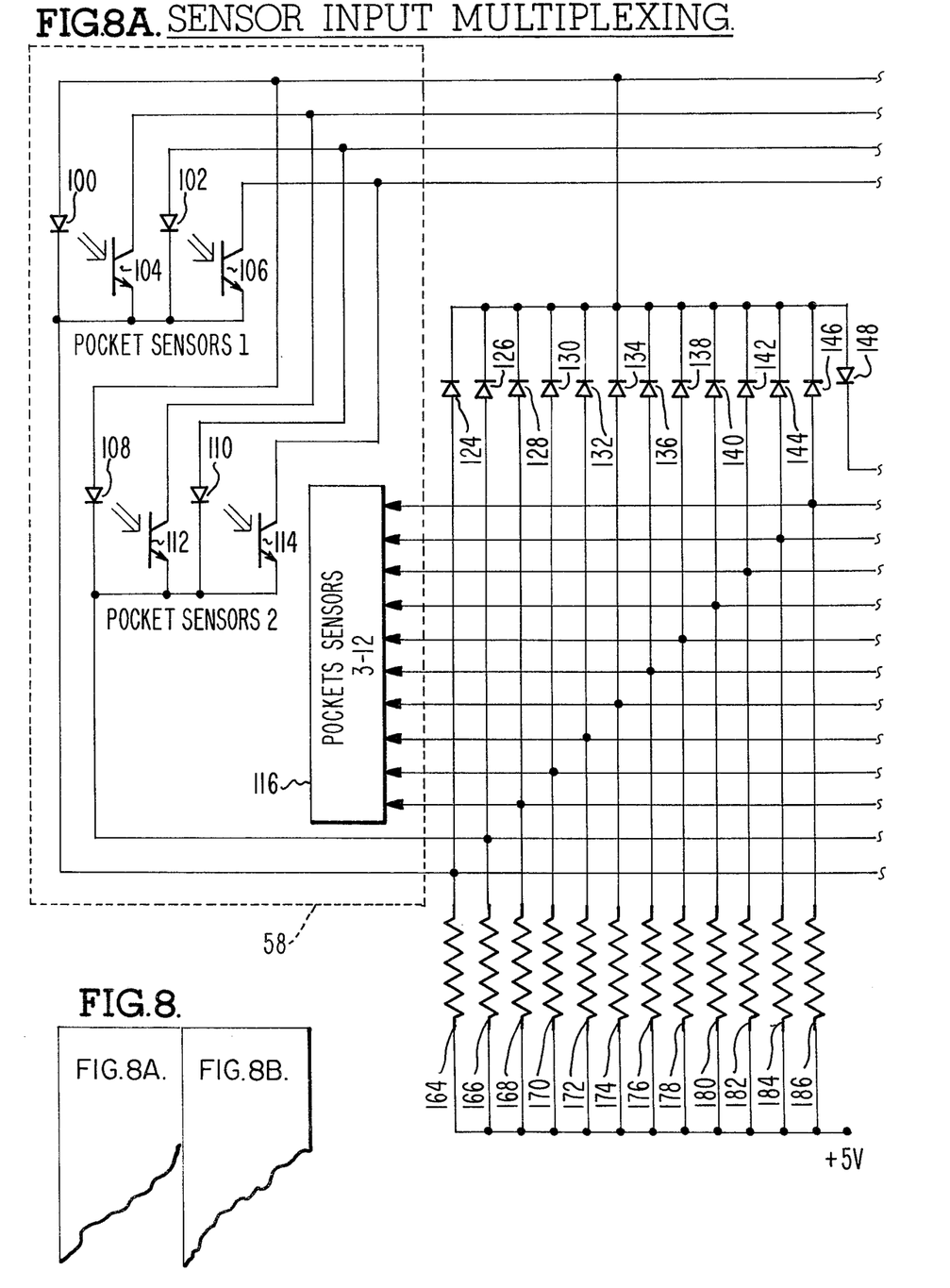
FIG. 8 is a diagram illustrating the relationship between FIGS. 8A and 8B.
FIGS. 8A and 8B are a partially block and partially schematic diagram of the sensor input multiplexing of FIG. 5.
Figure 8B:
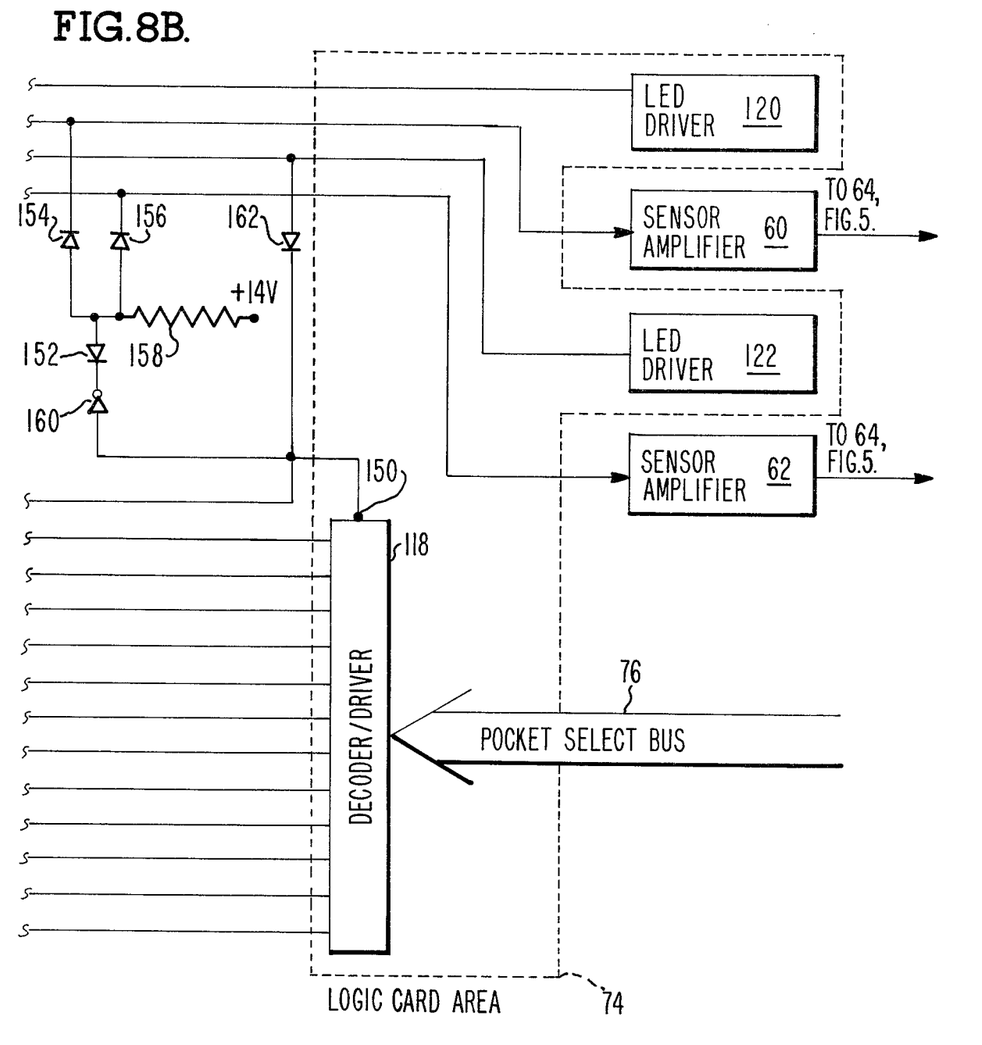

FIGS. 8A and 8B detail the sensor input multiplexing circuit of the preferred embodiment of the invention. A conventional sensor input multiplexing arrangement would require four signal lines per pocket plus one common line for all of the pockets, resulting in a total of 49 signal lines for a 12 pocket circuit. The sensor input multiplexing circuit of the preferred embodiment of the invention relies on the unidirectional characteristics of light emitting diodes and phototransistors to permit the use of 1 signal line per pocket plus four common lines for all of the pockets, resulting in a total of 16 signal lines for a 12 pocket circuit.

Pocket 1 sensors of the step-in and step-out sensors 58 are comprised of a pair of light emitting diodes 100 and 102 and a pair of phototransistors 104 and 106. Pocket 2 sensors are comprised of a pair of light emitting diodes 108 and 110 and a pair of phototransistors 112 and 114. Identical circuit arrangements are used within a set of sensors labelled pockets 3-12 sensors 116.

An LED driver 120 drives each of the step-in light emitting diodes 100, and 108, and the other step-in light emitting diodes within the sensors 116. An LED driver 122 drives each of the step-out light emitting diodes 102 and 110 and the other step-out light emitting diodes within the sensors 116. A set of diodes 124, 126, 128, 130, 132, 134, 136, 138, 140, 142, 144 and 146 have their cathodes connected in common to the output of the LED driver 120. The anodes of the diodes 124 through 146 are connected to the common point of the pocket 1 and 2 sensors and sensors 116. A diode 148 has its anode connected to the output of the LED driver 120 and its cathode to a output 150 of the decoder/driver 118.

A diode 152 has its anode connected to the junction of a pair of diodes 154 and 156 and a resistor 158. The cathode of the diode 154 is connected to the input of sensor amplifier 60, and the cathode of the diode 156 is connected to the input of sensor amplifier 62. An inverter 160 has its input connected to the junction of output 150, the cathode of a diode 162 and the cathode of the diode 148. The anode of the diode 162 is connected to the output of the LED driver 122. A set of resistors 164, 166, 168, 170, 172, 174, 176, 178, 180, 182, 184, and 186 are each connected in common to a +5 volt voltage source. The other side of each of the resistors 164 through 186 is connected to an output of the decoder/driver 118.

In operation the pocket select bus 76 sends a command to the decoder/driver 118. In response to this command the decoder/driver 118 selectively grounds the common connection of all of the light emitting diodes and phototransistors of a particular pocket, thereby completing the circuits with the LED drivers 120 and 122 and the sensor amplifiers 60 and 62. It is to be understood that although the outputs of the decoder/driver 118 selectively connect the selected common connections to near ground potential, any potential which permits forward current to flow in the selected light emitting diodes could be utilized. The decoder/driver 118 is then commanded to select another pocket by grounding the common connection of all of the light emitting diodes and phototransistors of that particular pocket. At any one time only one particular common connection is grounded by the decoder/driver 118. It is to be understood that although the light emitting diodes 100, 102, 108 and 110 and the phototransistors 104, 106, 112 and 114 are shown connected with a particular polarity, the polarity of each type of device may be reversed and utilized by appropriately modifying either the LED drivers 120 and 122 or the sensor amplifiers 60 and 62.

The diodes 124 through 148 operate to limit the reverse current through the light emitting diodes 100, 102, 108, 110 and those within sensors 116. The decoder/driver 118 utilized in the preferred embodiment of the invention is a Texas Instruments Ser. No. 7445. When a particular output of the decoder driver is grounded, all of the other outputs are at a potential which can be as high as 14 volts D.C. due to the potential of the input of the sensor amplifiers 60 and 62. In order to protect the light emitting diodes in each of the pocket sensors, the diodes 124 through 148 operate to limit the reverse voltage across the light emitting diodes to approximately 1.0 volt. The output 150 is grounded for 300 microseconds between successive pocket select commands.

The resistors 164 through 186 operate to pull up the potential of all of the outputs of the decoder/driver 118, except that output which is at ground potential. A value of 2000 ohms for each of the resistors 164 through 186 have been found satisfactory for an operative embodiment of the invention.

In order to improve the response time of the phototransistors 104, 106, 112, 114, and those within the sensors 116, the diodes 152, 154, and 156, together with the inverter 160 operate to precharge each of the pocket sensors prior to a particular set of sensors being selected. The resistor 158 is selected to provide a time constant which is one tenth that of the time constant of the phototransistor and either of the sensor amplifiers 60 or 62. This arrangement the outputs of the sensor amplifiers 60 and 62 to reach their correct value more quickly, thus minimizing the time required to determine the status of the selected pocket sensors.

Figure 9:
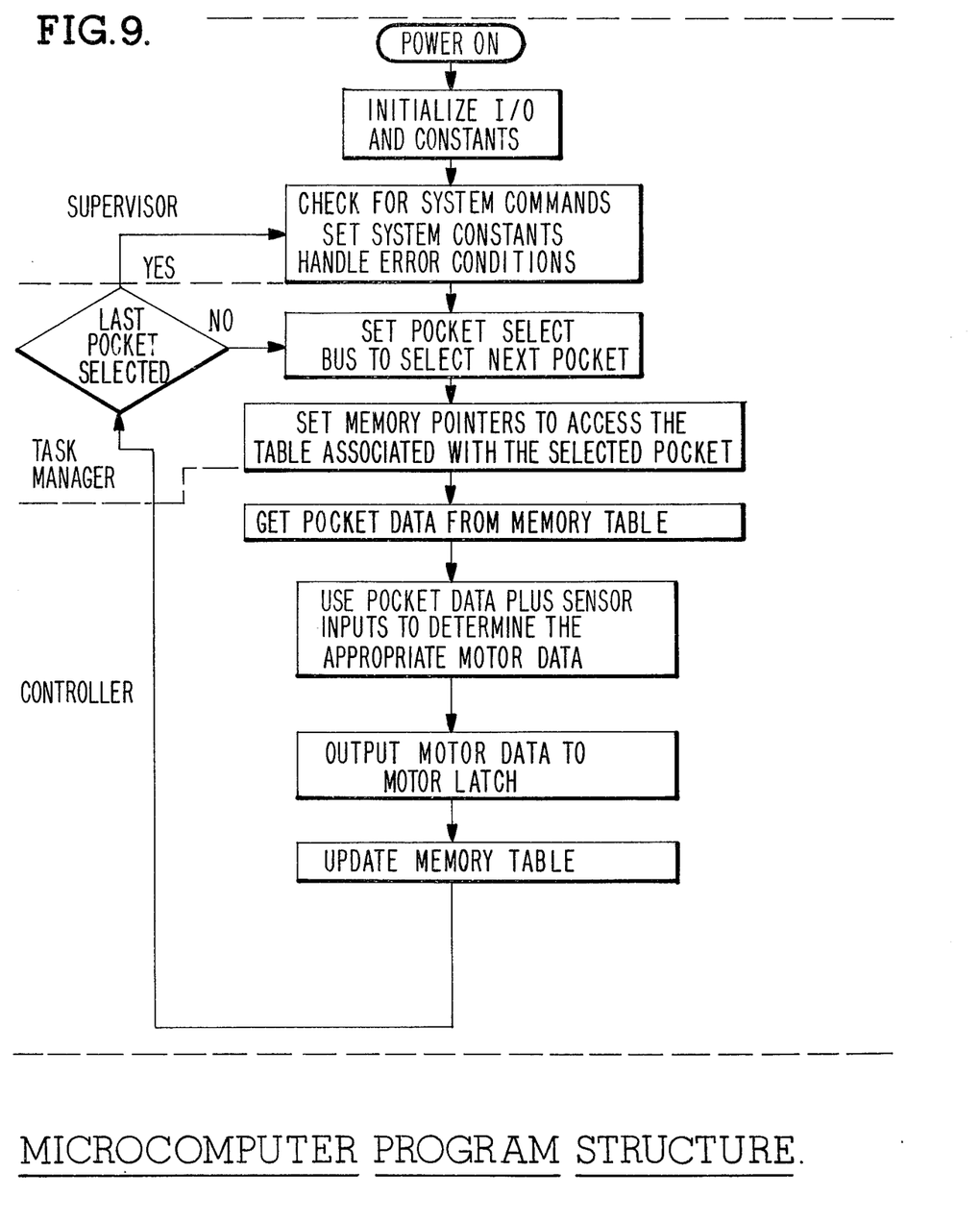
FIG. 9 is a flow diagram of the program structure for the micro-computer of FIG. 5.

The program structure utilized in the preferred embodiment of the invention is shown in FIG. 9. The highest level in the program hierarchy is the supervisor. The supervisor establishes system constants specifying such things as the number of pockets to be controlled, and the stepping rate required in each direction. The supervisor also handles exception conditions generated by lower levels of the program hierarchy. In addition, it accepts commands from the system bus to change system constants, or to change individual pocket data tables. When all supervisory operations are complete, the supervisor passes control to the task manager program.

The purpose of the task manager program is to select each pocket in turn, and to allow the controller program to take whatever action is appropriate for that pocket. After all the pockets have been handled, control is returned to the supervisor. The task manager selects a particular pocket by outputting the appropriate code on the pocket select bus. It also sets memory pointers for use by the controller program in accessing the memory data table associated with the selected pocket. In addition, it implements a delay required for the output of the step-in and step-out sensors to become valid after being selected.

The controller program analyses the output of the step-in and step-out sensors, and a history of previous conditions, as stored in the associated memory table, and determines the appropriate action. If a stepping motor movement is required, it calculates the motor phases to be energized and outputs them to the motor latch. In addition, if defined exception conditions occur, the controller sets program flags to alert the supervisor.

In the multiplexed controller, the maximum stepping rate of any motor is the reciprical of the program cycle time, where the program cycle time is defined to be the time between one selection of a pocket and a subsequent selection of the same pocket. Thus, if the program cycle time is 20 milliseconds, the maximum stepping rate of the motor is 50 steps per second. In the preferred embodiment of the invention two stepping rates are required, with the rate to be used dependent on the direction of motion. To accomplish this, the program cycle time is set to correspond to the higher stepping rate and steps in the negative direction are allowed on each cycle. Steps in the positive direction, however, are not allowed on each cycle. The controller program utilizes the data table associated with each pocket to record a positive step, and to inhibit further positive steps in the next four cycles. The results in a positive step rate which is one-fifth of the negative step rate.

The multiplexed controller by its very nature incorporates a discrete data sampling technique. As with all discrete data sampling control systems, the sampling rate must be high enough to obtain the desired system performance. To increase the sampling rate of the multiplexed controller, two approaches can be used. The first is simply to reduce the number of pockets the controller handles. The resulting reduction in the program cycle time will be reflected in a higher sampling rate. An alternative means for increasing the sampling rate is to replace the micro-computer 64 with a faster version.

The invention has been described with reference to a specific embodiment and it is to be understood that although this embodiment represents the best mode of practicing the invention known to the inventor at the time of filing the patent application, various modifications and additions to the illustrated embodiment are possible and accordingly the foregoing description is not to be construed in a limiting sense.

The embodiments of the invention in which an exclusive property or privilege is claimed are defined as follows:

1. A system for selectively maintaining a predetermined relationship between the size of a document stack and the position of a document retainer within each of a plurality of pockets of a document sorter, comprising:
   sensing means responsive to a pocket select signal operative to successively sense the relationship between the size of the document stack and the position of the document retainer within each of the pockets and to provide an output signal corresponding to each of the relationships,
   computing means operative to generate said pocket select signal according to a predetermined pattern and to process the output signal and thereby output a control signal, and
   driving means responsive to both of the pocket select and control signals, operative to successively position the document retainer of each of the pockets.

2. The system of claim 1 wherein said sensing means further comprises:
   a light emitting diode
   a phototransistor, and
   an actuator including a pivoted cantilever having an optical interruptor at one end operative to sense the position of a document stack and in response thereto alternatively position said optical interruptor between said light emitting diode and said phototransistor.

3. The system of claim 1 wherein said sensing means further comprises:
   at least two pocket sensors each sensor including at least one light emitting diode each diode having an anode and cathode, and at least one phototransistor each phototransistor having an emitter and collector,
   at least one light emitting diode driver each driver having its output connected in common to the anode of one light emitting diode in each of the sensors,
   at least one sensor amplifier each sensor amplifier having its input connected in common to the collector of one phototransistor in each of the sensors, and
   selector means operative to selectively connect the junction of the cathode of each of the diodes and the emitters of each of the phototransistors in one of the sensors to a potential which permits forward current to flow in the light emitting diodes of the selected sensor.

4. The system of claim 1 wherein said sensing means further comprises:
   at least two pocket sensors each sensor including at least one light emitting diode each diode having an anode and cathode, and at least one phototransistor each phototransistor having an emitter and collector.
   at least one light emitting diode driver each driver having its output connected in common to the cathode of one light emitting diode in each of the sensors,
   at least one sensor amplifier each sensor amplifier having its input connected in common to the emitter of one phototransistor in each of the sensors, and
   selector means operative to selectively connect the junction of the anode of each of the diodes and the collector of each of the phototransistors in one of the sensors to a potential which permits forward current to flow in the light emitting diodes of selected sensor.

5. A time-division multiplex circuit operative to selectively connect one of a plurality of sensors to a sensor amplifier, comprising:
   a plurality of sensors each sensor including at least one light emitting diode each diode having an anode and cathode, and at least one phototransistor each phototransistor having an emitter and collector,
   at least one light emitting diode driver each driver having its output connected in common to the anode of one light emitting diode in each of the sensors,
   at least one sensor amplifier each sensor amplifier having its input connected in common to the collector of one phototransistor in each of the sensors, and
   selector means operative to selectively connect the junction of the cathode of each of the diodes and the emitters of each of the phototransistors in one of the sensors to a potential which permits forward current to flow in the light emitting diodes of the selected sensor.

6. The circuit of claim 5 wherein said selector means further comprises:
   precharging means operative to precharge the collector of each of the phototransistors.

7. The circuit of claim 5 wherein said selector means further comprises:
   current limiting means operative to limit the reverse current flowing through each of the light emitting diodes.

8. A time-division multiplex circuit operative to selectively connect one of a plurality of sensors to a sensor amplifier, comprising:
   a plurality of sensors each sensor including at least one light emitting diode each diode having an anode and cathode, and at least one phototransistor each phototransistor having an emitter and collector,
   at least one light emitting diode driver each driver having its output connected in common to the cathode of one light emitting diode in each of the sensors,
   at least one sensor amplifier each sensor amplifier having its input connected in common to the emitter of one phototransistor in each of the sensors, and
   selector means operative to selectively connect the junction of the anodes of each of the diodes and the collectors of each of the phototransistors in one of the sensors to a potential which permits forward current to flow in the light emitting diodes of the selected sensor.

9. The circuit of claim 8 wherein said selector means further comprises:
   precharging means operative to precharge the emitter of each of the phototransistors.

10. The circuit of claim 8 wherein said selector means further comprises:
    current limiting means operative to limit the reverse current flowing through each of the light emitting diodes.

11. A method for selectively maintaining a predetermined relationship between the size of a document stack and the position of a document retainer within each of a plurality of pockets of a document sorter, comprising the steps of:
   generating successive pocket select signals,
   upon the command of the pocket select signals successively sensing the relationship between the size of the document stack and the position of the document retainer within each of said pockets to provide a successive output signals corresponding to each of the relationships,
   processing the output signals to produce successive control signals successively driving each document retainer in a desired direction in response to each pair of corresponding control signals and pocket select signals.

* * * * *